UNITED STATES PATENT OFFICE.

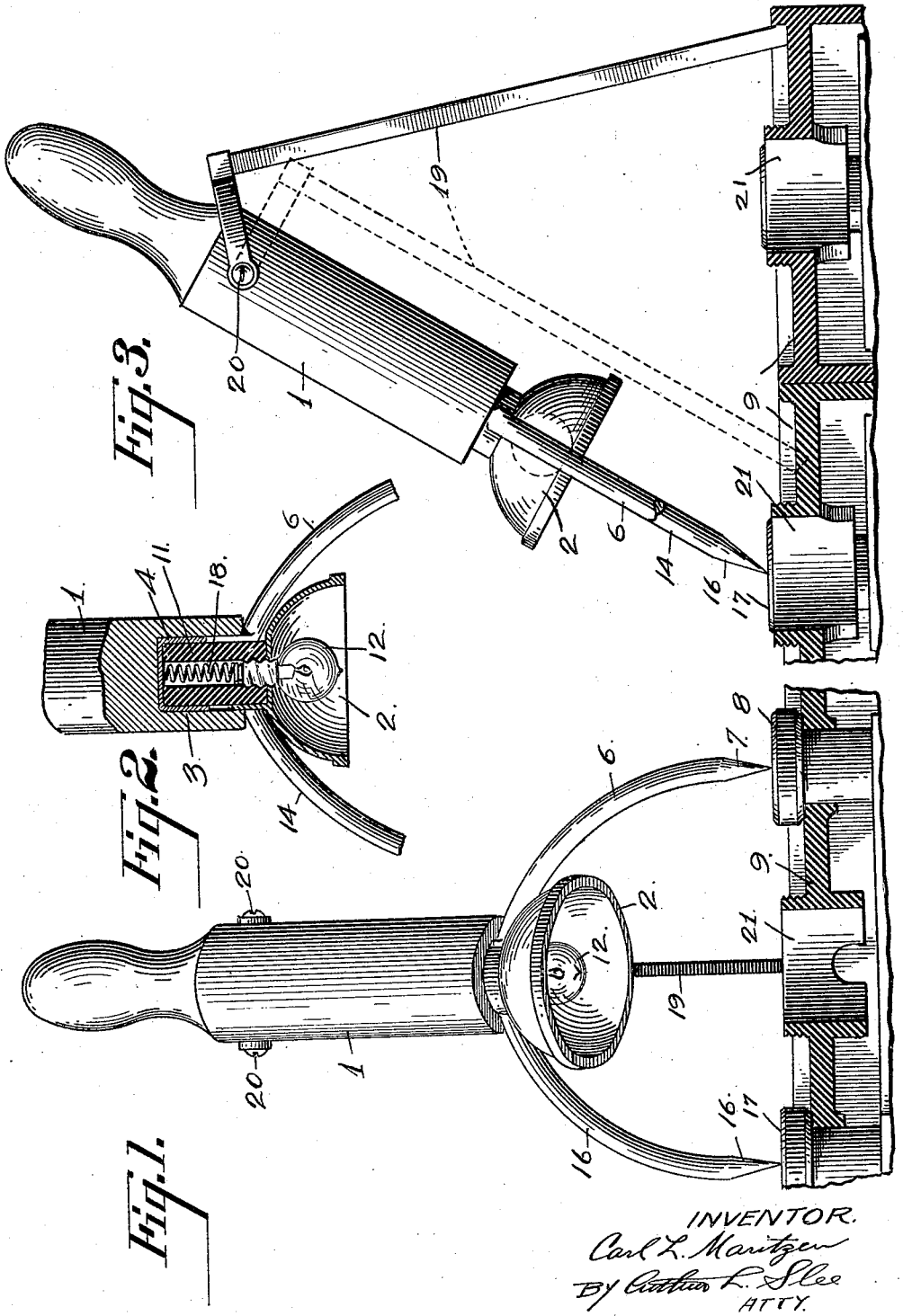

CARL L. MARITZEN, OF SAN FRANCISCO, CALIFORNIA.

BATTERY-TESTING LAMP.

1,415,254.   Specification of Letters Patent.   Patented May 9, 1922.

Application filed January 22, 1921. Serial No. 439,284.

*To all whom it may concern:*

Be it known that I, CARL L. MARITZEN, a citizen of the United States, residing in the city and county of San Francisco and State of California, have invented a new and useful Improvement in a Battery-Testing Lamp, of which the following is a specification.

My invention relates to a new article of manufacture comprising a storage battery testing lamp wherein two legs of a tripod operate as conductors to engage the terminals of a battery and to convey current from the same to light the lamp and to position the same directly over the opening of said battery to illuminate the interior of the same and at the same time render said interior or opening accessible for refilling and other purposes.

The primary object of the present invention is to provide a new and improved article of manufacture arranged to facilitate the examination, testing and refilling of storage batteries and the like.

A further object of the invention is to provide a new and improved article of manufacture of the character described adapted to direct light rays into the opening of a storage battery in such a manner as to facilitate the examination of the interior of said battery.

A still further object is to provide a new and simple device of the character described which shall be arranged to draw current from the battery being examined for the purpose of illuminating the interior thereof, thereby eliminating a separate dry cell to light the lamp.

It is also an object to provide a simple, cheap and effective device adapted to contact with the terminals of a storage battery and to support a light at an angle to the opening and slightly to one side thereof to render said opening accessible for examination and refilling purposes.

I accomplish these and other objects by means of the improved device disclosed in the drawings forming a part of the present specification wherein like characters of reference are used to designate similar parts throughout the said specification and drawings, and in which—

Fig. 1 is a broken sectional view of a portion of one cell of a storage battery disclosing my invention applied thereto;

Fig. 2 is a broken detailed view, partly in section, disclosing the manner in which two legs of the tripod are connected to the lamp and arranged as conductors therefor.

Fig. 3 is a side elevation of Fig. 1.

Referring to the drawings, the invention consists of a tripod comprising a handle 1 of dielectric material, preferably wood.

The handle 1 is bored centrally at its lower end as at 3 within which bore is inserted a metallic cap 4 terminating in a leg 6 having its lower end pointed as at 7 to facilitate contact with one terminal 8 of one cell of a storage battery 9, as disclosed in Fig. 1 of the drawings.

Seated within the cap 4 is a sleeve 11 of fibre or other dielectric material, around the lower end of which is mounted the reflector 2 arranged to receive an electric lamp 12 which screws through the reflector 2 and into the sleeve 11, thereby contacting the sleeve of said lamp 12 with said reflector from which extends a second metallic leg 14, also pointed as at 16 to engage the other terminal 17 of the storage battery 9.

The legs 6 and 14 are thus arranged as conductors to convey current from the battery 9 to the lamp 12, the connection from the leg 6 being had through the metal cap 4, and a spring 18 interposed between said cap 4 and the tip of the lamp 12.

A dielectric leg 19 is pivotally connected to the upper end of the handle 1 as at 20 and is arranged to be set to support the said handle 1 and lamp 12 therein at an angle to the battery 9 so that access may be had to the central opening 21 while illuminated by said lamp, as disclosed in Fig. 3 of the drawings.

The leg 19 is pivotally connected so that the handle 1 and lamp 12 therein may be supported at any convenient angle to said battery 9 and also to permit folding of said leg 19 adjacent the handle 1 when not in use, as disclosed in dotted lines in Fig. 3 of the drawings.

In operation the cap, not shown, is unscrewed from the opening 21 and the points 7 and 16 of the legs 6 and 14, respectively, are driven or pressed into the terminals 8 and 17 so as to penetrate any grease, oil or other non-conducting accumulation of débris which may have formed upon said terminals, thereby insuring proper contact and passage of electrical current from the battery 9 to the lamp 12, thereby lighting said lamp and illuminating the interior of the battery 9 through said opening 21. The leg 19 is then positioned to support the tripod in the desired angle so that there will be no direct reflection of the light rays from the lamp from the surface of the electrolyte within the cell, thereby facilitating examination of the interior of said cell.

The legs 6 and 14 are spaced to position the lamp 12 midway between said legs so as to direct light from said lamp directly into the opening 21 which is also arranged in standard batteries, midway between the terminals.

The angular disposition of the tripod and its lamp 12 also facilitate access through said opening 21 whereby a syringe or other instrument or tool may be readily inserted without interfering with the device.

Having thus described my invention what I claim as new and desire to secure by Letters Patent is—

1. A new article of manufacture comprising a tripod two legs thereof being conductors and spaced to engage the terminals of a storage battery and the like; and an electric lamp connected to said legs and lighted by current from said battery passing through said legs, said lamp being positioned to direct light rays into the opening of said battery.

2. A new article of manufacture comprising a dielectric handle; an electric lamp mounted upon the handle; and electrical terminals connected to the lamp and handle and arranged to contact with the terminals of a storage battery to convey current to said lamp from said battery and to position said lamp over the opening of said battery whereby the interior of the same may be illuminated.

3. A new article of manufacture comprising a dielectric handle; an electric lamp mounted upon the handle; and electrical terminals connected to the lamp and handle and arranged to contact with the terminals of a storage battery to convey current to said lamp from said battery and to position said lamp over the opening of said battery whereby the interior of the same may be illuminated; and means for supporting said handle and lamp at an angle to said opening to render the same accessible.

4. A new article of manufacture comprising a dielectric handle; an electric lamp mounted upon the handle; and electrical terminals connected to the lamp and handle and arranged to contact with the terminals of a storage battery to convey current to said lamp from said battery and to position said lamp over the opening of said battery whereby the interior of the same may be illuminated; and dielectric means for supporting said handle and lamp at an angle to said opening to render the same accessible.

5. A new article of manufacture comprising a dielectric handle; an electric lamp mounted upon the handle; and electrical terminals connected to the lamp and handle and arranged to contact with the terminals of a storage battery to convey current to said lamp from said battery and to position said lamp over the opening of said battery whereby the interior of the same may be illuminated; and means for projecting light rays from said lamp downward only.

6. A new article of manufacture comprising a dielectric handle; an electric lamp mounted upon the handle; and electrical terminals connected to the lamp and handle and arranged to contact with the terminals of a storage battery to convey current to said lamp from said battery and to position said lamp over the opening of said battery whereby the interior of the same may be illuminated; and a suitable reflector mounted upon said handle and around the lamp to direct light rays from said lamp into said opening.

7. A new article of manufacture comprising a dielectric handle; an electric lamp mounted upon the lower end of said handle; conductors connected to said handle and lamp and arranged as supporting legs for said handle and spaced to engage the terminals of a storage battery and to position said lamp over the opening of said battery, whereby light rays from said lamp may be directed into said opening; and a third leg of dielectric material pivotally connected to said handle and arranged to support the same at an angle to said opening to render the same accessible.

8. A new article of manufacture comprising a dielectric handle; an electric lamp mounted upon the lower end of said handle; conductors connected to said handle and lamp and arranged as supporting legs for said handle and spaced to engage the terminals of a storage battery and to position said lamp over the opening of said battery, whereby light rays from said lamp may be directed into said opening; and a third leg of dielectric material pivotally connected to said handle and arranged to support the same at an angle to said opening to render the same accessible; and a suitable reflector mounted upon the handle and around the lamp and arranged to shade said lamp and direct the rays thereof into said opening.

In witness whereof I hereunto set my signature.

CARL L. MARITZEN.